United States Patent
Higuchi

(10) Patent No.: US 10,406,683 B2
(45) Date of Patent: Sep. 10, 2019

(54) ROBOT AND CONTROL METHOD THEREOF

(71) Applicant: HONDA MOTOR CO., LTD., Tokyo (JP)

(72) Inventor: Hirofumi Higuchi, Saitama (JP)

(73) Assignee: HONDA MOTOR CO., LTD., Tokyo (JP)

(*) Notice: Subject to any disclaimer, the term of this patent is extended or adjusted under 35 U.S.C. 154(b) by 184 days.

(21) Appl. No.: 15/463,056

(22) Filed: Mar. 20, 2017

(65) Prior Publication Data
US 2017/0282359 A1 Oct. 5, 2017

(30) Foreign Application Priority Data
Mar. 29, 2016 (JP) ................... 2016-066936

(51) Int. Cl.
| | | |
|---|---|---|
| *B25J 9/16* | (2006.01) | |
| *B25J 9/12* | (2006.01) | |
| *B25J 19/00* | (2006.01) | |
| *B25J 15/08* | (2006.01) | |

(52) U.S. Cl.
CPC .............. *B25J 9/1612* (2013.01); *B25J 9/12* (2013.01); *B25J 15/083* (2013.01); *B25J 19/0004* (2013.01); *G05B 2219/41285* (2013.01); *G05B 2219/42284* (2013.01)

(58) Field of Classification Search
CPC ... B25J 9/12; B25J 9/126; B25J 9/1612; B25J 9/1669; B25J 9/1679; B25J 19/0004; B25J 15/0206–024; B25J 15/0253–0293; B25J 15/083; G05B 2219/41279–41288; G05B 2219/42284; G05B 2219/39196
See application file for complete search history.

(56) References Cited

U.S. PATENT DOCUMENTS

| | | | | |
|---|---|---|---|---|
| 2008/0181757 | A1* | 7/2008 | Wheeler | ................... B25J 9/104 414/738 |
| 2013/0054029 | A1* | 2/2013 | Huang | ..................... B25J 5/005 700/259 |
| 2014/0366673 | A1* | 12/2014 | Yamazaki | .............. B25J 9/0087 74/490.03 |

FOREIGN PATENT DOCUMENTS

| | | |
|---|---|---|
| JP | 5444421 | 12/2013 |
| JP | 2014-010546 | 1/2014 |

* cited by examiner

*Primary Examiner* — Spencer D Patton
(74) *Attorney, Agent, or Firm* — Rankin, Hill & Clark LLP

(57) ABSTRACT

Provided is a robot and a control method thereof in which the motion of an arm 12 as a specified limb among a plurality of limbs 12 and 14 extended from a body 10 is controlled according to a specified trajectory. If a first interaction state, in which a hand 126, which is an end effector, interacts with a horizontal wood member L (j) of a ladder L in a first mode is implemented, then a control command is given to an actuator 41 that drives the hand 126 to cause the hand 126 to perform a grasping motion, thereby implementing a second interaction state, in which the hand 126 interacts with the horizontal wood member L (j) in a second manner. If the second interaction state is implemented, a control command is given to a brake 42 to maintain a motion halt state of the hand 126.

4 Claims, 6 Drawing Sheets

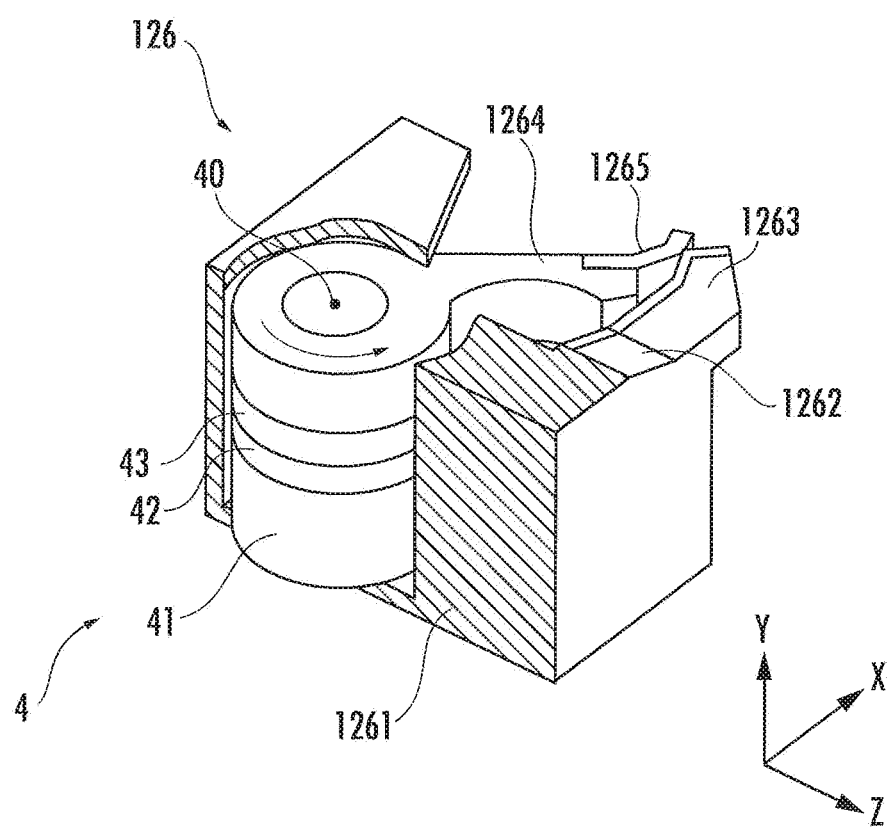

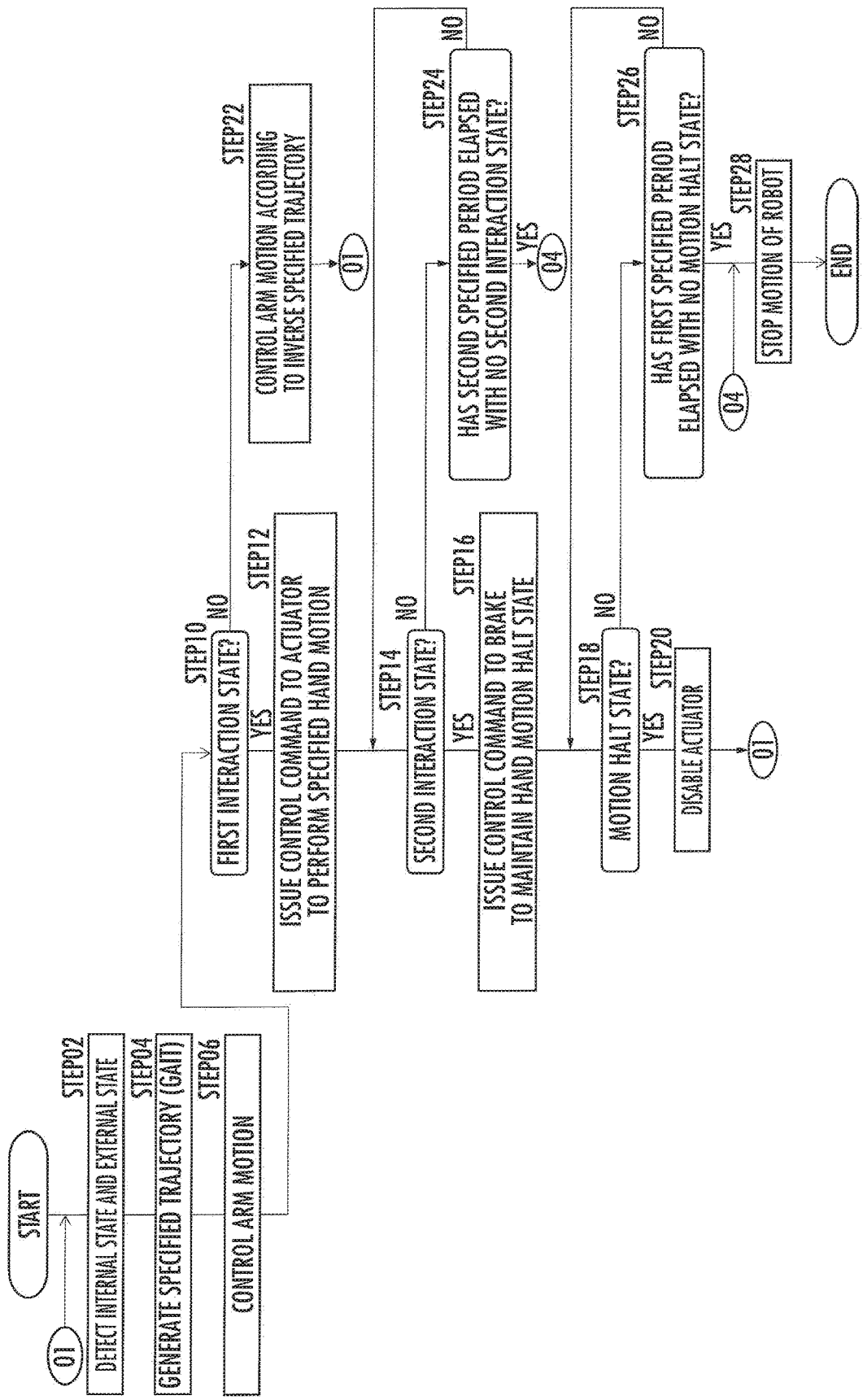

ROBOT AND CONTROL METHOD THEREOF

BACKGROUND OF THE INVENTION

Field of the Invention

The present invention relates to a robot provided with a body and a plurality of limbs extended from the body.

Description of the Related Art

There has been proposed a technique for notifying, upon detection of a malfunction of a motor with a brake used in a robot, the malfunction without cutting off the excitation of the motor and releasing the brake, taking into consideration a further decrease in a braking torque (refer to Patent Document 1)

Patent Document 1: Japanese patent 5444421

However, in a robot adapted to move while operating an end effector, which is attached to a distal end portion of a limb, to interact with an object, there are cases where merely adopting a motor with a brake to drive the end effector leads to an improper motion of the robot in view of the interaction state.

SUMMARY OF THE INVENTION

An object of the present invention is, therefore, to provide a robot and a control method thereof that enable the motion of an end effector, which is attached to a distal end portion of a limb, to be properly controlled on the basis of an interaction state when the end effector is operated to interact with an outside world.

The present invention relates to a robot including a body, a plurality of limbs extended from the body, an end effector attached to a distal end portion of a specified limb, which is at least one limb among the plurality of limbs, an actuator that drives the end effector, a brake connected to an output shaft of the actuator, and a controller that controls the operation of each of the plurality of limbs, the actuator, and the brake, and the present invention also relates to a control method of the same.

The robot in accordance with the present invention is characterized in that the controller includes a main control element which controls the motion of the specified limb according to a specified trajectory, a first sub control element which issues a control command to the actuator so as to cause the end effector to carry out a specified motion for implementing a second interaction state, in which the end effector interacts with an outside world thereof in a second mode, which is different from a first mode, in a case where a first interaction state, in which the end effector interacts with the outside world thereof in the first mode, is implemented while the motion of the specified limb is being controlled according to the specified trajectory by the main control element, and a second sub control element which issues a control command to the brake so as to maintain a motion halt state of the end effector in a case where the second interaction state is implemented after the control command is given to the actuator by the first sub control element.

A control method of a robot in accordance with the present invention includes a main control step of controlling a motion of the specified limb according to a specified trajectory, a first sub control step of issuing a control command to the actuator so as to cause the end effector to carry out a specified motion for implementing a second interaction state, in which the end effector interacts with an outside world thereof in a second mode, which is different from a first mode, in a case where a first interaction state, in which the end effector interacts with the outside world thereof in the first mode, is implemented during the main control step, and a second sub control step of issuing a control command to the brake so as to maintain a motion halt state of the end effector in a case where the second interaction state is implemented after the control command is given to the actuator by the first sub control step.

Preferably, the motion of the specified limb is controlled according to an inverse specified trajectory obtained by inverting the specified trajectory in a time series manner in a case where the first interaction state is not implemented while the main control element is controlling the motion of the specified limb according to the specified trajectory.

Preferably, the first sub control element disables an output function of the actuator in a case where the motion halt state of the end effector is maintained after the control command is given to the brake by the second sub control element.

Preferably, the first sub control element stops the motion of at least the specified limb in a case where the motion halt state of the end effector has not been continuously maintained for a first specified period of time or more after the control command is given to the brake by the second sub control element.

Preferably, the second sub control element stops the motion of at least the specified limb in a case where the second interaction state continuously fails to be implemented for a second specified period of time or more.

According to the robot and the control method thereof in accordance with the present invention, the motion of a specified limb among a plurality of limbs extended from a body is controlled according to a specified trajectory. The specified trajectory is defined by the time series of one or a plurality of state amounts indicative of the motion state of a specified limb. In this process, if the first interaction state, in which the end effector is interacting with an object present in the outside world thereof in the first mode, is implemented, then it is probable or highly probable that the mode of the interaction with the object will be changed to the second mode, which is different from the first mode, by the specified motion of the end effector.

In this case, therefore, the control command is given to the actuator that drives the end effector to cause the end effector to carry out the specified motion thereby to implement the second interaction state, in which the end effector interacts with an object present in the outside world thereof in the second mode. If the second interaction state is implemented, then the motion halt state of the end effector is maintained by issuing the control command to the brake.

With this arrangement, an external force acting on the end effector is transmitted to the body through the specified limb, enabling the body and eventually the entire robot to move, using the external force as the propulsive force. Thus, the motion of the end effector is properly controlled on the basis of the state of the interaction between the end effector and the outside world (more precisely, any object that is present in the outside world).

BRIEF DESCRIPTION OF THE DRAWINGS

FIG. 3 is a configuration explanatory diagram of an end effector of the robot as the embodiment of the present invention;

FIG. 4 is a flowchart of a control method of the robot as the embodiment of the present invention;

DESCRIPTION OF THE PREFERRED EMBODIMENTS (Configuration of the Robot)

Figure 1:
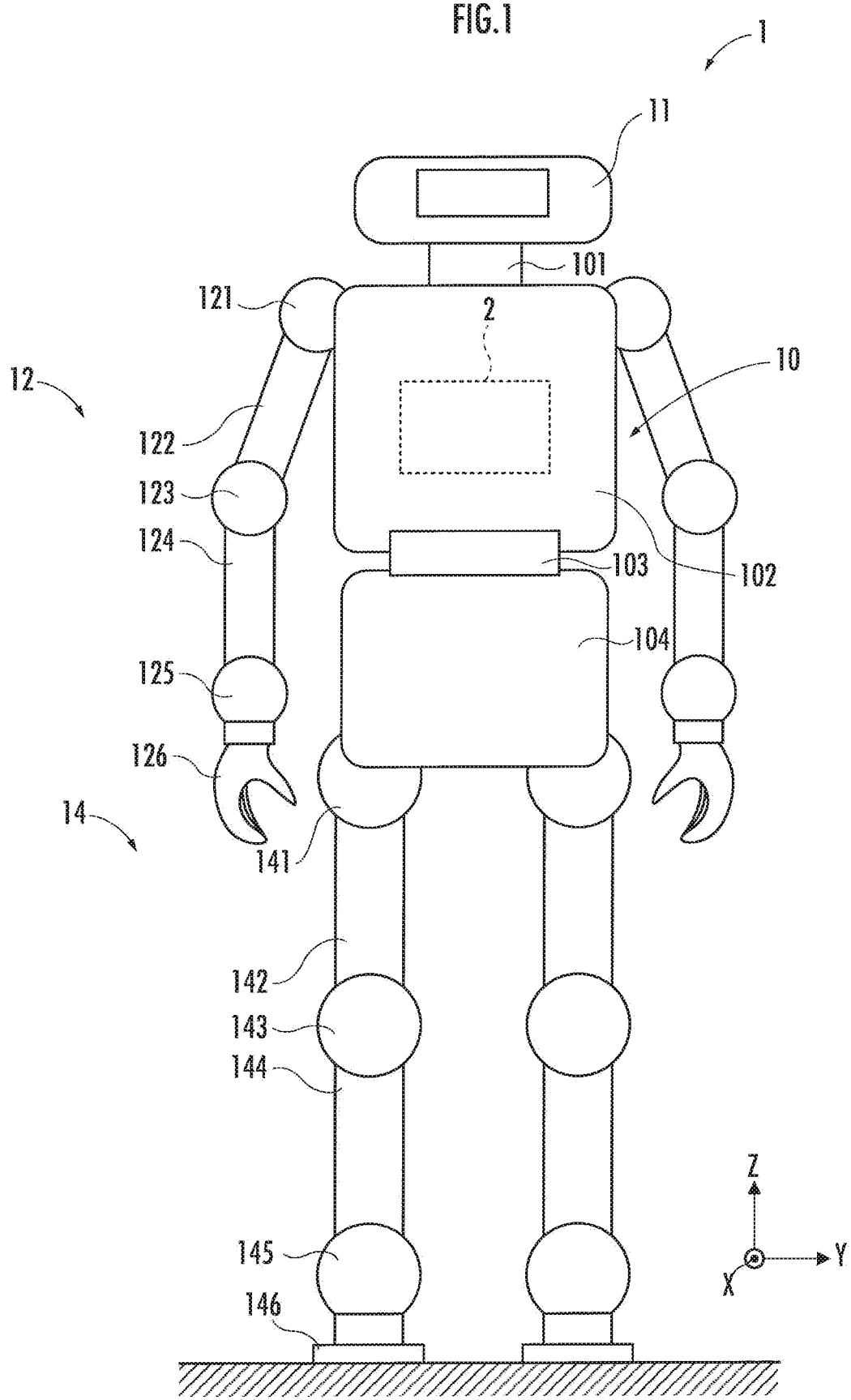
FIG. 1 is a configuration explanatory diagram of a robot as an embodiment of the present invention.

A robot 1, which is an embodiment of the functional device according to the present invention illustrated in FIG. 1, is a legged mobile robot. As with a human, the robot 1 is equipped with a body 10, a head 11 disposed above the body 10, left and right arms 12 extended from upper both sides of a body upper section 102 of the body 10, hands 126 provided at the distal ends of the left and right arms 12, and left and right legs 14 extended downward from a body lower section 104 of the body 10.

The left and right arms 12 and the left and right legs 14 correspond to "a plurality of limbs," the left and right arms 12 correspond to "specified limbs," and the left and right hands 126 correspond to "end effectors." In other words, according to the present embodiment, the robot 1 has four limbs, including the specified limbs, and two end effectors attached to the distal end portions of the two specified limbs. The number of the limbs constituting the robot may be any number that is two or more, and the number of the specified limbs included in the plurality of limbs may be any number that is one or more, and all of the plurality of limbs rather than some thereof may correspond to the specified limbs.

The body 10 is composed of the body upper section 102 and the body lower section 104, which are vertically connected to be relatively rotatable about a yaw axis at a trunk joint mechanism 103. The head 11 is capable of movement, including the rotation about the yaw axis, with respect to the body 10 at a neck joint mechanism 101.

Each of the arms 12 has a first arm link 122 and a second arm link 124. The body 10 and the first arm link 122 are connected through a shoulder joint mechanism (a first arm joint mechanism) 121, the first arm link 122 and the second arm link 124 are connected through an elbow joint mechanism (a second arm joint mechanism) 123, and the second arm link 124 and the hand 126 are connected through a wrist joint mechanism (a third arm joint mechanism) 125. The shoulder joint mechanism 121 has the degree of freedom of rotation about a roll axis, a pitch axis and the yaw axis, the elbow joint mechanism 123 has the degree of freedom of rotation about the pitch axis, and the wrist joint mechanism 125 has the degree of freedom of rotation about the roll axis, the pitch axis, and the yaw axis.

Each of the legs 14 has a first leg link 142, a second leg link 144, and a foot 146. The body 10 and the first leg link 142 are connected through a hip joint mechanism (a first leg joint mechanism) 141, the first leg link 142 and a second leg link 144 are connected through a knee joint mechanism (a second leg joint mechanism) 143, and the second leg link 144 and the foot 146 are connected through a foot joint mechanism (a third leg joint mechanism) 145. The hip joint mechanism 141 has the degree of freedom of rotation about the roll axis, the pitch axis and the yaw axis, the knee joint mechanism 143 has the degree of freedom of rotation about the pitch axis, and the foot joint mechanism 145 has the degree of freedom of rotation about the roll axis and the pitch axis. The hip joint mechanism 141, the knee joint mechanism 143 and the foot joint mechanism 145 constitute a leg joint mechanism group.

The degrees of translational and rotational freedom of each joint mechanism included in the leg joint mechanism group may be changed as necessary. Further, any one joint mechanism among the hip joint mechanism 141, the knee joint mechanism 143 and the foot joint mechanism 145 may be omitted, and the remaining two joint mechanisms may be combined to constitute the leg joint mechanism group. Further, if the leg 14 has a second leg joint mechanism that is separate from the knee joint, then the leg joint mechanism group may be constituted to include the second leg joint mechanism. The bottom of the foot 146 is provided with an elastic material like the one disclosed in Japanese Patent Application Laid-Open No. 2001-129774 to ease a landing impact.

The body upper section 102 and the body lower section 104, the head 11, the links 122 and 124 of the arms 12, the hands 126 (more precisely, the palm and the link of each finger mechanism, which are constituent elements thereof), the links 142 and 144 of the legs 14, and the feet 146 correspond to the plurality of portions, the relative positions and attitudes of which can be changed by actuators 41.

The robot 1 incorporates a plurality of internal state sensors $S_1$ for measuring the internal states, including the position and attitude, in a world coordinate system thereof (refer to FIG. 3). Encoders (not illustrated) that output signals based on the bending angles (joint angles) of the joint mechanisms of the robot 1, inclination sensors that output signals based on the attitude (identified by an azimuth and an elevation angle) of the body 10, and pressure sensors for determining whether the foot 146 is in contact with or off a floor correspond to the internal state sensors $S_1$. A contact sensor provided at a specified location of each of the hands 126 to detect the state of interaction of the hand 126 (the end effector) with an outside world or an object present in the outside world, and sensors for detecting the currents supplied to the actuators 41 also correspond to the internal state sensors $S_1$.

The robot 1 is provided with external state sensors $S_2$, such as imaging devices, for measuring the external state, including the position of an object in the surroundings thereof (refer to FIG. 3). For example, a pair of left and right head cameras, such as CCD cameras or infrared cameras, which are mounted on the head 11, which capture the images in an area in front of the robot 1 and which are capable of sensing light in various frequency bands, can be adopted as the imaging devices. Further, a waist camera (active sensor) installed on a front lower section of the body 10 to detect a near-infrared laser beam emitted downward in front of the robot 1 and reflected by an object so as to measure the position, the azimuth or the like of the object can be adopted as the imaging device.

The robot 1 further includes a controller 2 and a plurality of drive mechanisms 4 that drive the plurality of portions by driving the plurality of joint mechanisms (refer to FIG. 3).

(Configuration of the Controller)

Figure 2:
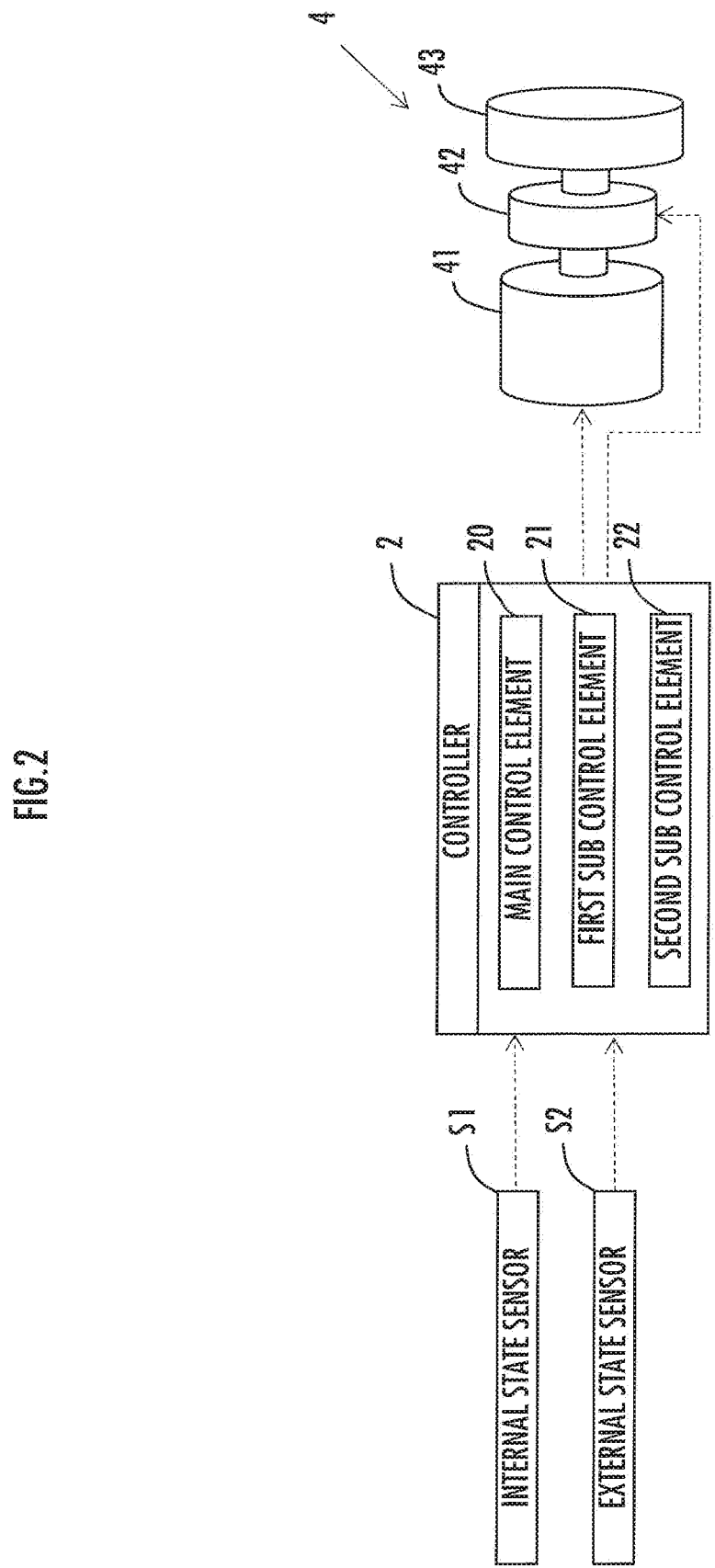
FIG. 2 is a configuration explanatory diagram of a controller of the robot as the embodiment of the present invention.

The controller 2 illustrated in FIG. 2 is composed of an electronic control unit (ECU) as hardware and an application program as software. The ECU or a computer is composed primarily of a CPU or a multi-core processor (arithmetic processing unit), a memory (storage device), such as a ROM or a RAM, and input/output interface circuits.

The controller 2 includes a main control element 20, a first sub control element 21, and a second sub control element 22. The controller 2 and the elements 20, 21 and 22 thereof are configured or designed such that the processor reads necessary data and a program from a predetermined area of the memory and carries out appropriate arithmetic processing on the data according to the program. The elements, namely, 20, 21 and 22 may be composed of a common processor or some elements and the remaining elements may be composed of a plurality of individual processors. For example, the main control element 20 may be composed of a main processor, a driver unit may be provided for each of the drive mechanisms 4 constituting the hand 126 (end effector), and the first sub control element 21 and the second sub control element 22 may be composed of sub processors constituting the driver units. Each of the drive mechanisms 4 includes the actuator 41, a brake 42, and a decelerator 43, as will be discussed hereinafter.

The main control element 20 controls the overall motion of the robot 1, including the motion of each of the arms 12 and the motion of each of the legs 14, according to a specified trajectory. While the motion of each of the arms 12 (specified limbs) is being controlled by the main control element 20 according to a specified trajectory, if a first interaction state, in which the hand 126 interacts with the outside world thereof in a first mode, is implemented, then the first sub control element 21 issues a control command to the actuator 41 so as to cause the hand 126 to carry out a specified motion to implement a second interaction state, in which the hand 126 interacts with the outside world thereof in a second mode, which is different from the first mode. The second sub control element 22 issues a control command to the brake 42 so as to maintain the motion halt state of the hand 126 in the case where the second interaction state is implemented after the control command is given to the actuator 41 by the first sub control element 21.

(Configuration of the End Effector)

When in a reference attitude, the right hand 126 illustrated in FIG. 3 is positioned on the right side of the robot 1 to constitute the right hand. The hand 126 includes a hand base 1261 corresponding to the palm and back of a human hand, a first finger 1262, which is a single member corresponding to a forefinger, a middle finger, a ring finger and a little finger of a human, and a second finger 1264 corresponding to a human thumb.

The first finger 1262 extends from the distal end in the longitudinal direction of the hand base 1261, curving with respect to the hand base 1261. The first finger 1262 is configured integrally with the hand base 1261 and fixed to the hand base 1261. In the hand 126 provided with the first finger 1262 configured as described above, the first finger 1262 applies a load to an object through a surface thereof on the opposite side from the hand base 1261 when performing a pushing motion. Meanwhile, when performing a pulling motion, the first finger 1262 applies a load to the object through the surface of the first finger 1262 on the hand base 1261 side.

The first finger 1262 is formed to be longer than the second finger 1264 in the direction (Y-axis direction) orthogonal to the longitudinal direction of the hand base 1261 and the direction in which the first finger 1262 extends, and has a projection 1263 which is located at a position opposing the distal end portion of the second finger 1264 and which projects in the direction (X-axis direction) away from the hand base 1261. The projection 1263 enables the hand 126 to perform a motion like pressing a button by the distal end portion of the first finger 1262. The projection 1263 may be omitted according to, for example, the width of the first finger 1262.

The second finger 1264 is attached to the hand base 1261 such that the second finger 1264 opposes the surface of the distal end portion of the first finger 1262, the surface being on the hand base 1261 side. The second finger 1264 is rotated by the drive mechanism 4 provided inside the hand base 1261 such that the distal end portion of the second finger 1264 is moved toward or away from the first finger 1262. The configuration of the second finger 1264 described above enables the hand 126 to easily perform a motion requiring precise movement, such as the motion of pinching or holding an object by the first finger 1262 and the second finger 1264.

The second finger 1264 has a hook 1265 that comes in contact with the projection 1263 in a state in which the distal end portion of the second finger 1264 is brought close to the first finger 1262 (hereinafter referred to as "the closed state"). The length of the hook 1265 in the direction (the Y-axis direction) orthogonal to the lengthwise direction of the hand base 1261 and the direction in which the first finger 1262 extends corresponds to the length of the projection 1263 of the first finger 1262.

Provision of the hook 1265 enables the hand 126 to easily pinch, by the projection 1263 and the hook 1265, a small object that is difficult to be pinched by the first finger 1262 and the second finger 1264. Further, using the hook 1265 makes it possible to perform a motion of pushing a small button that is difficult to be pushed by the projection 1263. In the second finger 1264, the hook 1265 may be omitted.

The drive mechanism 4 rotates the second finger 1264 about an axis 40 positioned inside the hand base 1261 so as to move the distal end portion of the second finger 1264 toward or away from the first finger 1262.

Figure 5A:
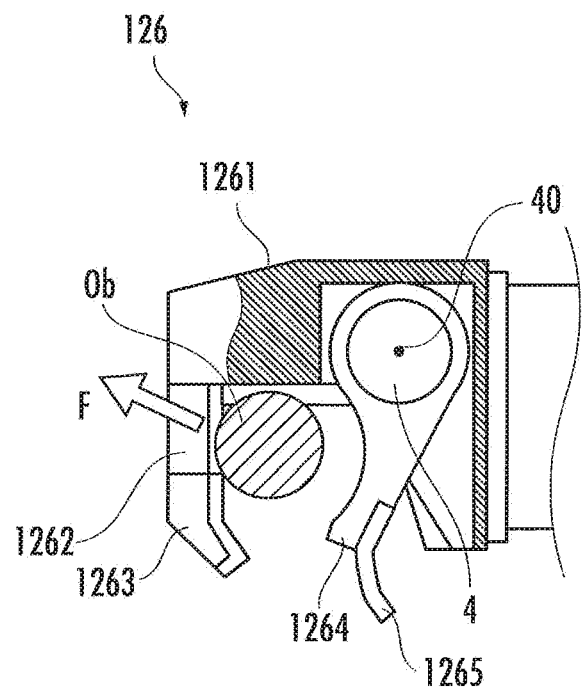
FIG. 5A is an explanatory diagram illustrating a first interaction state of the end effector (hand)
Figure 5B:
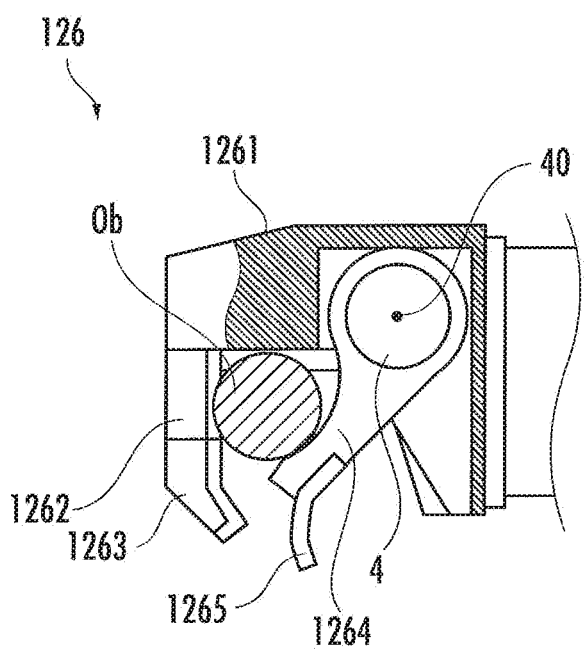
FIG. 5B is an explanatory diagram illustrating a second interaction state of the end effector (hand)

The drive mechanism 4 is composed of the actuator 41, such as an electric motor, the brake 42, such as an electromagnetic brake, which controls the transmission of a driving force from the actuator 41, and the decelerator 43 that decelerates the driving force from the actuator 41 transmitted through the intermediary of the brake 42 and transmits the decelerated driving force to the second finger 1264. Further, the drive mechanism 4 is configured such that the second finger 1264 is placed in an opened state as illustrated in FIG. 5A during a drive mode, while the second finger 1264 is placed in a closed state as illustrated in FIG. 5B during a non-drive mode. In the closed state, the hand 126 can hold an object Ob by three-point contact, namely, by the surface of the first finger 1262 on the hand base 1261 side, the surface of the second finger 1264 on the hand base 1261 side, and the surface of the hand base 1261 on the side where the first finger 1262 extends.

Hence, even if the supply of the driving force is interrupted during an operation, the state in which the object is being held will not be cleared, thus preventing the hand 126 from dropping the object. Further, in the case where, for example, the robot 1 is climbing up a ladder, the fall of the robot 1 will be prevented.

Characteristically, the actuator 41, such as an electric motor, is generally capable of instantaneously producing a large torque (hereinafter, the maximum torque thereof will be referred to as "the instantaneous maximum torque"), but the rated torque (the retention torque) thereof is smaller than the instantaneous maximum torque.

Therefore, it has been required to use a motor having a sufficiently large rated torque (retention torque), i.e. a large-sized motor, to perform a motion of keeping on holding an object by the hand of a conventional robot, resulting in an increased size of the entire hand. Meanwhile, the drive mechanism 4 is configured such that the brake 42 is provided between the second finger 1264 and the actuator 41, which generates the driving force for rotating the second finger 1264. The brake 42 is configured to enable the second finger 1264 to move in the drive mode (in an energized mode) and to interrupt the motion of the second finger 1264 in the non-drive mode.

To perform the motion of keeping on holding an object by the hand 126, the brake 42 is first energized to make it possible to transmit the driving force from the actuator 41 to the second finger 1264, and then the second finger 1264 is rotated by the instantaneous maximum torque generated at the actuator 41 thereby to grasp the object (i.e. to set the second finger 1264 to the opened state and then to the closed state). Thereafter, the brake 42 is de-energized and the second finger 1264 is fixed.

In other words, the hand 126 is enabled to maintain the state in which the object is grasped (the same state as the state in which the actuator 41 is continuing to generate the rated torque) when the actuator 41 is generating no driving force.

Thus, the actuator 41 used for the hand 126 is required merely to generate an instantaneous maximum torque that is adequate for rotating the second finger 1264 when grasping the object, so that an actuator that is smaller than that in a conventional robot can be adopted. As a result, the drive mechanism 4 even when provided with the brake 42 can be made smaller and lighter as a whole than a conventional drive mechanism. The brakes 42 may be omitted in the drive mechanisms 4 constituting some or all of joint mechanisms that are different from the hand 126.

(Robot Control Method)

Figure 6A:
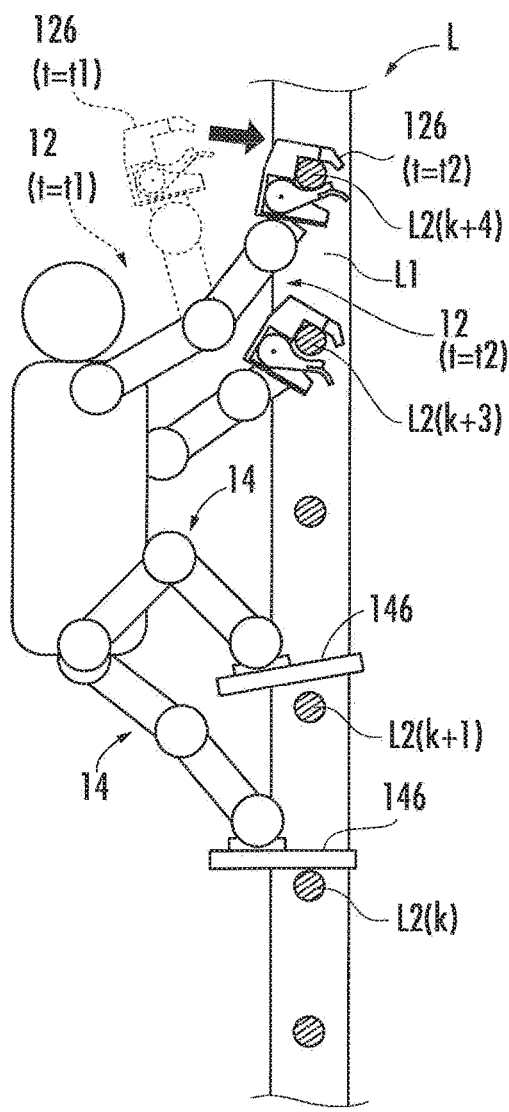
FIG. 6A is an explanatory diagram illustrating an example of the motion of the robot.
Figure 6B:
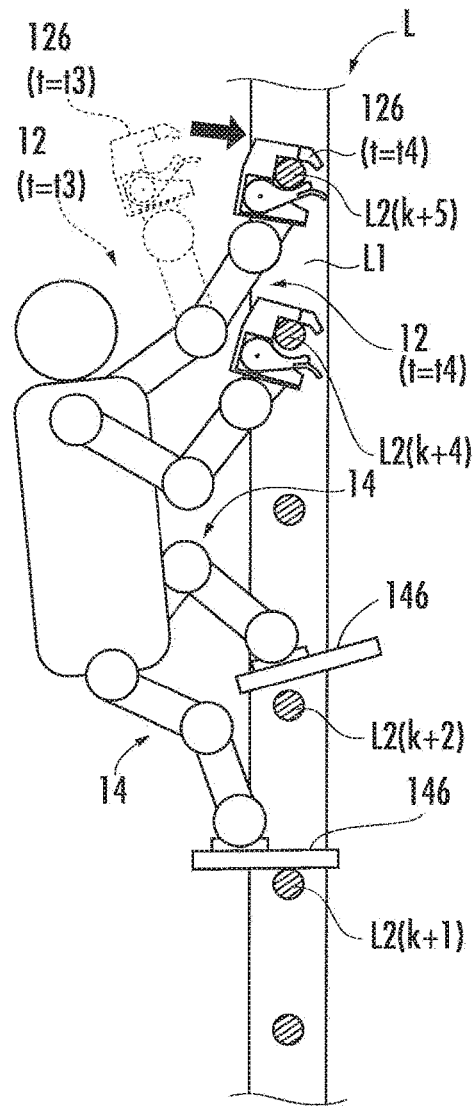
FIG. 6B is an explanatory diagram illustrating another example of the motion of the robot.

The main control element 20 detects the internal state and the external state of the robot 1 on the basis of the output signals of the internal state sensors $S_1$ and the external state sensors $S_2$ (STEP02 of FIG. 4). For example, as illustrated in FIG. 6A and FIG. 6B, when the robot 1 climbs up a ladder L, the positions of a pair of vertical wood members L1 (only the vertical wood member L1 on the rear side being illustrated) and a plurality of horizontal wood members L2 (j) (j=1, 2, . . . ), which are installed between the vertical wood members L1 are detected as the external states, and the total center-of-gravity position of the robot 1 and the external force or the reaction force applied from the horizontal wood members L2 (j) to the robot 1 at the hands 126 and the feet 146 are detected as the internal states.

Based on the internal states and the external states of the robot 1, which have been detected, the main control element 20 generates the general action plan or the gait of the robot 1, including the specified trajectories of the arms 12 and the legs 14 (STEP04 of FIG. 4). For example, as illustrated in FIG. 6A, a gait is generated to implement the transition from a state in which the right hand 126 is off the ladder L ($t=t_1$) to a state in which the right hand 126 holds the horizontal wood member L (k+4) ($t=t_2$) in a state in which the left foot 146 is on the horizontal wood member L (k) (k=1, 2, . . . ), the left hand 126 is holding the horizontal wood member L (k+3), and the right leg 14 is being moved to place the right foot 146 on the horizontal wood member L (k+1). Further, as illustrated in FIG. 6B, a gait is generated to implement the transition from a state in which the left hand 126 is off the ladder L ($t=t_3$) to a state in which the left hand 126 holds the horizontal wood member L (k+5) ($t=t_4$) in a state in which the right foot 146 is placed on the horizontal wood member L (k+1), the right hand 126 holds the horizontal wood member L (k+4), and the left leg 14 is being moved to place the left foot 146 on the horizontal wood member L (k+2).

The main control element 20 actuates at least one (only one in the present embodiment) of the arms 12 according to a specified trajectory, so that the control commands are output to the actuators 41 constituting the shoulder joint mechanism 121, the elbow joint mechanism 123 and the wrist joint mechanism 125 of at least the arm 12 (STEP06 of FIG. 4). Alternatively, while the motion of one of the arms 12 is being controlled according to a specified trajectory, the motion of at least some of the other arm 12 and the left and right legs 14 may be simultaneously controlled according to a specified trajectory.

Thereafter, while the arm 12 is being moved according to the specified trajectory, the first sub control element 21 determines whether the first interaction state, in which the hand 126, which is the end effector, interacts with the outside world thereof in the first mode, has been implemented (STEP10 of FIG. 4). The first mode is, for example, a mode in which an external force having a directional component moving outward from the inner side (on the hand base 1261 side) of the first finger 1262 is being applied from an object Ob (the horizontal wood member L2 (k) of the ladder L) to the first finger 1262 of the hand 126 that is in the opened state as illustrated in FIG. 5A.

The determination is carried out according to, for example, whether the external force has been detected by external sensors or contact sensors which constitute the internal state sensors $S_1$ and which are disposed on the inner side of the first finger 1262. The determination may alternatively be carried out according to whether the acceleration of the hand 126 detected by an acceleration sensor disposed on the hand base 1261 or the like has intermittently or significantly changed.

Further alternatively, any other states that enable the second interaction state to be implemented by the specified motion of the hand 126 may be defined as the first interaction state, as will be discussed hereinafter. To be specific, a mode in which an external force having a directional component moving outward from the inner sides of the hand base 1261 and the second finger 1264 or the like is being applied from the object Ob to the hand base 1261 and the second finger 1264 in addition to the first finger 1262 of the hand 126 in the opened state may be defined as the first mode.

If the first sub control element 21 determines that the first interaction state has been implemented (YES in STEP10 of FIG. 4), then a control command is given or output to the actuator 41 of the hand 126 to cause the hand 126 to perform the specified motion (STEP12 of FIG. 4). The specified motion may be, for example, the motion for rotating the second finger 1264 about the axis 40 in order to change the state from the opened state illustrated in FIG. 5A to the closed state illustrated in FIG. 5B.

Meanwhile, if the first sub control element 21 determines that the first interaction state has not been implemented despite the motion of the arm 12 according to the specified trajectory (NO in STEP10 of FIG. 4), then the main control element 20 issues the control command to the pertinent actuator 41 so as to actuate the arm 12 on the basis of an inverse specified trajectory according to the determination result (STEP22 of FIG. 4). Thus, for example, the right arm 12 is moved according to the position/attitude trajectory that will move the hand 126 away from the horizontal wood member L (k+4), i.e. the position/attitude trajectory that is reverse in a time series manner from the position/attitude trajectory of the right arm 12 that will move the hand 126 toward the horizontal wood member L (k=4) from $t=t_1$ (refer to the dashed line) to $t=t_2$ (refer to the solid line), as illustrated in FIG. 6A Thereafter, the processing that follows the processing for detecting the internal states and the external states of the robot 1 (STEP02 of FIG. 4) is repeated.

After the control command is given to the actuator 41 by the first sub control element 21, the second sub control element 22 determines whether the second interaction state, in which the hand 126, which is the end effector, interacts with the outside world thereof in the second mode, has been implemented (STEP14 of FIG. 4). The second mode is, for example, a mode in which an external force having a directional component moving outward from the inner side (the hand base 1261 side) of the first finger 1262 and the second finger 1264 of the hand 126 in the closed state as illustrated in FIG. 5B is being applied from the object Ob (the horizontal wood member L2 (k) of the ladder L) to the first finger 1262 and of the second finger 1264.

The determination is performed on the basis of, for example, whether the difference between the command value of the rotational angle of the second finger 1264 included in the control command to the actuator 41 and the actual value detected by an angle sensor is a predetermined value or more. Alternatively, the determination may be performed on the basis of whether the difference between a current command value included in the control command to the actuator 41 (more accurately the drive circuit thereof) and the actual value detected by a current sensor is a predetermined value or more.

If the second sub control element 22 determines that the second interaction state has been implemented (YES in STEP14 of FIG. 4), then a control command is given or output to the brake 42 of the hand 126 to maintain the motion halt state of the hand 126 (STEP16 of FIG. 4). Thus, the hand 126 can be held in the closed state illustrated in FIG. 5B.

Meanwhile, if the second sub control element 22 determines that the second interaction state has not been implemented (NO in STEP14 of FIG. 4), then the second sub control element 22 determines whether the negative determination result has continued for a second specified period of time or more or for a second specified number of times or more (STEP24 of FIG. 4). If the determination result is negative (NO in STEP24 of FIG. 4), then the determination on whether the second interaction state has been implemented will continue (STEP14 of FIG. 4). Meanwhile, if the determination result is affirmative (YES in STEP24 of FIG. 4), then the main control element 20 issues the control command to the pertinent actuator 41 so as to stop the motion of the robot 1 according to the determination result (STEP28 of FIG. 4).

After the control command is given to the brake 42 of the hand 126, the second sub control element 22 determines whether the motion halt state or the braked state of the hand 126 has been maintained (STEP18 of FIG. 4). The determination is performed, for example, in the same manner as the determination on whether the second interaction state has been implemented.

If the second sub control element 22 determines that the motion halt state of the hand 126 has been maintained (YES in STEP18 of FIG. 4), then the actuator 41 of the hand 126 is disabled (STEP20 of FIG. 4). The motion of the actuator 41 itself is prohibited by, for example, setting the gain of the position or angle control loop of the actuator 41 to zero.

After that, the processing that follows the detection of the internal states and the external states of the robot 1 (STEP02 of FIG. 4) is repeated. This enables the robot 1 to climb up the ladder L in the manner illustrated in, for example, FIG. 6A and FIG. 6B. In the case where the actuator 41 of the hand 126 is disabled, and the motion of the arm 12 with the brake 42 set in the braking state is controlled as described above, the actuator 41 is enabled and the braking state of the brake 42 is released.

If the second sub control element 22 determines that the motion halt state of the hand 126 has not been implemented (NO in STEP18 of FIG. 4), then the second sub control element 22 determines whether the negative determination result has continued for a first specified period of time or more or for a first specified number of times or more (STEP26 of FIG. 4). If the determination result is negative (NO in STEP26 of FIG. 4), then the determination on whether the motion halt state has been implemented will continue (STEP18 of FIG. 4). Meanwhile, if the determination result is affirmative (YES in STEP26 of FIG. 4), then the main control element 20 issues the control command to the pertinent actuator 41 so as to stop the motion of the robot 1 according to the determination result (STEP28 of FIG. 4).

(Operation and Effect)

According to the robot 1 and the control method thereof in accordance with the present invention, the motion of the arm 12 corresponding to a specified limb among the plurality of limbs 12 and 14 extended from the body 10 is controlled according to a specified trajectory. In this process, if the first interaction state, in which the hand 126, which is the end effector, interacts with the horizontal wood member L (j) of the ladder L in the first mode, is implemented, then it is probable or highly probable that the hand 126 is caused to hold the horizontal wood member L (j) by the specified motion for changing the state of the hand 126 from the closed state to the opened state (refer to FIG. 5A).

In this case, therefore, the control command is given to the actuator 41 that drives the hand 126 to cause the hand 126 to perform the grasping motion so as to implement the second interaction state, in which the hand 126 interacts with the horizontal wood member L (j) in the second mode (refer to YES in STEP10→STEP12 in FIG. 4, and refer to FIG. 5B). If the second interaction state is implemented, the control command is given to the brake 42 to maintain the motion halt state of the hand 126 (refer to YES in STEP14→STEP16 in FIG. 4).

Thus, the external force or the reaction force applied from the horizontal wood member L (j) to the hand 126 is transmitted to the body 10 through the arm 12, enabling the body 10 and eventually the entire robot 1 to move by using the external force as the propulsive force (refer to FIG. 6A and FIG. 6B). As described above, the motion of the hand 126 is properly controlled according to the state of the interaction between the hand 126 and the outside world (more precisely, a certain object present in the outside world).

DESCRIPTION OF REFERENCE NUMERALS

1 . . . Robot, 2 . . . Controller, 4 . . . Drive mechanism, 10 . . . Body, 12 . . . Arm (Specified limb), 14 . . . Leg (Limb), 20 . . . Main control element, 21 . . . First sub control element, 22 . . . Second sub control element, 126 . . . Hand (End effector), 41 . . . Actuator, 42 . . . Brake, and 43 . . . Decelerator.

What is claimed is:

1. A robot comprising:
    a body;
    a plurality of limbs extended from the body;
    an end effector attached to a distal end portion of a specified limb, which is at least one limb among the plurality of limbs;
    an actuator that drives the end effector;
    a brake connected to an output shaft of the actuator; and
    a controller that controls a motion of each of the plurality of limbs, the actuator, and the brake,
    wherein the controller includes:
        a main control element which controls the motion of the specified limb according to a specified trajectory;
        a first sub control element which issues a control command to the actuator so as to cause the end effector to carry out a specified motion for implementing a second interaction state, in which the end effector interacts with an outside world thereof in a second mode, which is different from a first mode, in a case where a first interaction state, in which the end effector interacts with the outside world thereof in the first mode, is implemented while the motion of the specified limb is being controlled according to the specified trajectory by the main control element; and
        a second sub control element which issues a control command to the brake so as to maintain a motion halt state of the end effector in a case where the second interaction state is implemented after the control command is given to the actuator by the first sub control element, and
    wherein the motion of the specified limb is controlled according to an inverse specified trajectory obtained by inverting the specified trajectory in a time series manner in a case where the first interaction state is not implemented while the main control element is controlling the motion of the specified limb according to the specified trajectory.

2. A robot comprising:
    a body;
    a plurality of limbs extended from the body;
    an end effector attached to a distal end portion of a specified limb, which is at least one limb among the plurality of limbs;
    an actuator that drives the end effector;
    a brake connected to an output shaft of the actuator; and
    a controller that controls a motion of each of the plurality of limbs, the actuator, and the brake,
    wherein the controller includes:
        a main control element which controls the motion of the specified limb according to a specified trajectory;
        a first sub control element which issues a control command to the actuator so as to cause the end effector to carry out a specified motion for implementing a second interaction state, in which the end effector interacts with an outside world thereof in a second mode, which is different from a first mode, in a case where a first interaction state, in which the end effector interacts with the outside world thereof in the first mode, is implemented while the motion of the specified limb is being controlled according to the specified trajectory by the main control element; and
        a second sub control element which issues a control command to the brake so as to maintain a motion halt state of the end effector in a case where the second interaction state is implemented after the control command is given to the actuator by the first sub control element,
    wherein the first sub control element disables an output function of the actuator in a case where the motion halt state of the end effector is maintained after the control command is given to the brake by the second sub control element, and
    wherein the first sub control element stops the motion of at least the specified limb in a case where the motion halt state of the end effector has not been continuously maintained for a first specified period of time or more after the control command is given to the brake by the second sub control element.

3. A robot comprising:
    a body;
    a plurality of limbs extended from the body;
    an end effector attached to a distal end portion of a specified limb, which is at least one limb among the plurality of limbs;
    an actuator that drives the end effector;
    a brake connected to an output shaft of the actuator; and
    a controller that controls a motion of each of the plurality of limbs, the actuator, and the brake,
    wherein the controller includes:
        a main control element which controls the motion of the specified limb according to a specified trajectory;
        a first sub control element which issues a control command to the actuator so as to cause the end effector to carry out a specified motion for implementing a second interaction state, in which the end effector interacts with an outside world thereof in a second mode, which is different from a first mode, in a case where a first interaction state, in which the end effector interacts with the outside world thereof in the first mode, is implemented while the motion of the specified limb is being controlled according to the specified trajectory by the main control element; and
        a second sub control element which issues a control command to the brake so as to maintain a motion halt state of the end effector in a case where the second interaction state is implemented after the control command is given to the actuator by the first sub control element, and
    wherein the second sub control element stops the motion of at least the specified limb in a case where the second interaction state continuously fails to be implemented for a second specified period of time or more.

4. A control method of a robot that includes a body, a plurality of limbs extended from the body, an end effector attached to a distal end portion of a specified limb, which is at least one limb among the plurality of limbs, an actuator that drives the end effector between an opened state and a closed state, a brake connected to an output shaft of the actuator, and a controller that controls a motion of each of the plurality of limbs, the actuator, and the brake, the control method comprising:
    a main control step of controlling the motion of the specified limb according to a specified trajectory;
    a first sub control step of issuing a control command to the actuator so as to cause the end effector to carry out a specified motion for implementing a second interaction state, in which the end effector interacts with an outside world thereof in a second mode in which an object gripped by the end effector in the closed state applies external force on the end effector, which is different from a first mode, in a case where a first interaction state, in which the end effector interacts with the outside world thereof in the first mode in which external force is applied to the end effector from the object while the end effector is in the opened state, is implemented during the main control step; and a second sub control step of giving a control command to the brake so as to maintain a motion halt state of the end effector in a case where the second interaction state is implemented after the control command is given to the actuator in the first sub control step, wherein, in the main control step, in a case where the first interaction state is not implemented while controlling the motion of the specified limb according to the specified trajectory, the motion of the specified limb is controlled according to an inverse specified trajectory obtained by inverting the specified trajectory in a time series manner.

* * * * *